(12) United States Patent
Finnigan et al.

(10) Patent No.: US 8,083,257 B2
(45) Date of Patent: Dec. 27, 2011

(54) INFLATORS AND METHOD FOR MANUFACTURING INFLATORS

(75) Inventors: Brian T. Finnigan, Lewisburg, OH (US); Venkatasubramanian Ananthanarayanan, Beavercreek, OH (US); James M. Payne, Grand Blanc, MI (US); Donald E. Warren, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/906,213

(22) Filed: Oct. 18, 2010

(65) Prior Publication Data

US 2011/0031726 A1 Feb. 10, 2011

Related U.S. Application Data

(62) Division of application No. 11/846,219, filed on Aug. 28, 2007, now Pat. No. 7,823,918.

(51) Int. Cl.
*B60R 21/26* (2011.01)
*B23K 11/00* (2006.01)

(52) U.S. Cl. ......... 280/736; 280/741; 219/59.1; 219/67; 219/78.16; 219/78.01

(58) Field of Classification Search .................. 280/736, 280/741; 219/59.1, 67, 78.16, 78.01
See application file for complete search history.

(56) References Cited

U.S. PATENT DOCUMENTS

| | | | |
|---|---|---|---|
| 6,552,294 B1 | 4/2003 | Ananthanarayanan et al. | |
| 6,623,048 B2 * | 9/2003 | Castel et al. .................. | 285/382 |
| 6,689,981 B1 | 2/2004 | Ananthanarayanan et al. | |
| 6,693,251 B1 | 2/2004 | Ananthanarayanan et al. | |
| 6,705,438 B2 | 3/2004 | Ananthanarayanan et al. | |
| 6,717,091 B2 | 4/2004 | Ananthanarayanan et al. | |
| 6,791,051 B2 | 9/2004 | Ananthanarayanan et al. | |
| 6,791,052 B1 | 9/2004 | Ananthanarayanan et al. | |
| 6,847,001 B2 | 1/2005 | Ananthanarayanan et al. | |
| 6,875,944 B2 | 4/2005 | Ananthanarayanan et al. | |
| 6,953,147 B2 | 10/2005 | Ananthanarayanan et al. | |
| 6,953,907 B2 | 10/2005 | Ananthanarayanan et al. | |
| 6,962,365 B2 | 11/2005 | Rink et al. | |
| 6,998,560 B2 | 2/2006 | Ananthanarayanan et al. | |
| 7,204,512 B2 | 4/2007 | Patterson et al. | |
| 7,323,653 B2 | 1/2008 | Ananthanarayanan et al. | |
| 7,343,862 B2 | 3/2008 | McCormick | |
| 7,390,019 B2 | 6/2008 | Gotoh et al. | |
| 7,423,232 B2 | 9/2008 | Ananthanarayanan et al. | |
| 7,438,313 B2 | 10/2008 | Bilbrey et al. | |
| 7,584,992 B2 | 9/2009 | Riedel et al. | |
| 7,637,535 B2 | 12/2009 | Gotoh et al. | |
| 7,654,565 B2 | 2/2010 | McCormick et al. | |
| 2003/0111832 A1 | 6/2003 | Kelley et al. | |
| 2005/0006352 A1 * | 1/2005 | Ananthanarayanan et al. .......................... | 219/117.1 |
| 2007/0158312 A1 * | 7/2007 | Wang et al. .................. | 219/59.1 |
| 2008/0156223 A1 | 7/2008 | Patterson et al. | |
| 2009/0114623 A1 | 5/2009 | Venkatasubramanian et al. | |
| 2010/0059975 A1 * | 3/2010 | Sattler et al. .................. | 280/741 |

* cited by examiner

*Primary Examiner* — Drew Brown
(74) *Attorney, Agent, or Firm* — Thomas N. Twomey (57) ABSTRACT

A closure assembly for an inflator comprises a housing and an outlet plate disposed within the housing. The outlet plate has an outlet opening configured to receive a burst disk. The outlet plate is joined to the housing by a deformation resistance weld. The deformation resistance weld is formed by contacting the outlet plate with a first electrode, contacting an exterior portion of the housing with a second electrode, and applying a voltage through the first and second electrodes to adhere a portion of the housing to a portion of the outlet plate.

7 Claims, 7 Drawing Sheets

INFLATORS AND METHOD FOR MANUFACTURING INFLATORS

BACKGROUND

The present invention relates to pressurized containers, and more specifically, to airbag cushion inflators and to apparatuses and methods for manufacturing the same.

It is known to provide an inflatable restraint system including an inflator and inflatable airbag cushion for protecting the occupants of a transportation vehicle during collisions. Automotive vehicles, for example, can be supplied with driver side airbag modules, passenger side airbag modules, and side airbag modules. Such airbag assemblies, for example, may be located within the hub of the steering wheel and in a recess in the instrument panel for protection of the vehicle occupants seated in opposing relation to such assemblies. In other examples, such airbag assemblies may be located within the seats and/or door panels for protection of the occupants during a side-impact event.

Methods for manufacturing airbag inflators typically require the welding of a number of parts together, particularly in light of the increasing complexity of inflators. Prior welding techniques used to manufacture airbag inflators have been either laser welding or friction welding.

Laser welding is a welding technique used to join multiple pieces of metal through the use of a laser. The beam provides a concentrated heat source, allowing for narrow, deep welds and high welding rates. The process is frequently used in high volume applications, such as in the automotive industry. Some of the shortcomings of laser welding are the very high cost of equipment and consumables such as shielding gas and lenses, high cycle time, uncertainty of consistently making a leak-tight joint, and somewhat low weld strength with a potential for porosity (due to high cooling rates, cracking can be a concern, especially when welding high-carbon steels).

Friction welding is a technique used to weld thermoplastics or metals by the heat generated through mechanical friction by rubbing the members to be joined against each other under pressure, with the addition of an upsetting force to plastically displace material. Some of the shortcomings of friction welding are the high cost of equipment, weld flash on both sides of the weld joint (some of which may be loose and difficult to remove), difficulty in controlling the finished part length upon welding, high cycle time, and the difficulty of gripping thin plates using a friction welding apparatus.

Accordingly, it is desirable to provide for the manufacturing of airbag inflators using welding techniques that can overcome at least some of the shortcomings of the prior welding techniques.

SUMMARY OF THE INVENTION

Exemplary embodiments of the present invention relate to a closure assembly for an inflator. The closure assembly comprises a housing and an outlet plate disposed within the housing. The outlet plate has an outlet opening configured to receive a burst disk. The outlet plate is joined to the housing by a deformation resistance weld. The deformation resistance weld is formed by contacting the outlet plate with a first electrode, contacting an exterior portion of the housing with a second electrode, and applying a voltage through the first and second electrodes to adhere a portion of the housing to a portion of the outlet plate.

Exemplary embodiments of the present invention also relate to an inflator for inflating an inflatable cushion of an airbag module. The inflator comprises an outer housing and a divider plate secured within the outer housing to define a first chamber and a second chamber of the outer housing. The divider plate has an orifice disposed therein. The orifice provides fluid communication between the first chamber and the second chamber. The divider plate is joined to the outer housing by a deformation resistance weld. The deformation resistance weld is formed by contacting the outer housing with a first electrode at an exterior portion of the outer housing proximate to the divider plate, contacting the divider plate with a second electrode disposed within the outer housing, and applying a voltage through the first and second electrodes to adhere a portion of the outer housing to a portion of the divider plate.

Exemplary embodiments of the present invention also relate to an inflator for inflating an inflatable cushion of an airbag module. The inflator comprises an inflator housing and a base plate configured to engage with an assembly for mounting the inflatable cushion to the airbag module. The base plate is joined to an open end of the inflator housing by a deformation resistance weld. The deformation resistance weld is formed by contacting the base plate with a first electrode, contacting an exterior portion the inflator housing with a second electrode proximate to the base plate, and applying a voltage through the first and second electrodes to adhere a portion of the inflator housing to a portion of the base plate.

Exemplary embodiments of the present invention also relate to a method for securing an outlet plate within a housing of an inflator. The method comprises inserting the outlet plate into the housing. The method further comprises applying pressure against the outlet plate with a first electrode in a first direction. The method further comprises applying pressure against an exterior portion of the housing with a second electrode in a second direction. The method further comprises welding the outlet plate to the housing by applying a voltage through the first and second electrodes to adhere a joining portion of the outlet plate to a joining portion of the housing.

Exemplary embodiments of the present invention also relate to a method for securing a divider plate within an outer housing of an inflator. The method comprises inserting the divider plate within the outer housing. The method further comprises inserting a first electrode configured to engage a portion of the divider plate into the outer housing. The method further comprises applying pressure against the divider plate with the first electrode electrode in a first direction. The method further comprises applying pressure against an exterior portion of the outer housing proximate to the divider plate with a second electrode in a second direction. The method further comprises welding the divider plate to the outer housing by applying a voltage through the first and second electrodes to adhere a joining portion of the divider plate to a joining portion of the outer housing.

Exemplary embodiments of the present invention also relate to a method for securing a base plate to an inflator housing of an inflator. The method comprises disposing the base plate proximate to an open end of the inflator housing. The method further comprises applying pressure against an exterior portion of the inflator housing proximate to the base plate with a first electrode in a first direction. The method further comprises applying pressure against the base plate with a second electrode in a second direction. The method further comprises welding the base plate to the inflator housing by applying a voltage through the first and second electrodes to adhere a joining portion of the base plate to a joining portion of the inflator housing.

Exemplary embodiment of the present invention also relate to a welding apparatus for deformation resistance welding a divider plate within an outer housing of an inflation device.

The apparatus comprises a first electrode and a second electrode. The first electrode is configured to be inserted into the outer housing. The first electrode has a contact end with an opening configured to receive a centrally protruding portion of the divider plate therein. The first electrode has an outer periphery that is smaller than an inner dimension of the housing. The second electrode comprises a pair of members removably secured to each other. The pair of members define an inner opening. The pair of members are configured to apply pressure to an exterior surface of the outer housing when the pair of members are secured to one another.

DETAILED DESCRIPTION OF EXEMPLARY EMBODIMENTS

Exemplary embodiments of the present invention are directed to devices for the containment and release of pressurized gas from an airbag inflator, and to apparatuses and methods for manufacturing the same. Particularly, as will be disclosed herein, exemplary embodiments of the present invention are directed to methods of manufacturing inflators using processes that involve the welding of certain parts to each other using deformation resistance welding techniques (DRW), and to inflators that have been manufactured using these techniques.

DRW is a resistance welding method that has been developed to join metal tubes to solids, sheet metal and other tubes. The process atomically bonds metals and creates solid-state joints through the heating and deformation of the mating surfaces. DRW can be used to form near instantaneous, full strength, leak-tight welds by heating metal surfaces only to the point of softening, followed by rapid, engineered compression of the joint. Slight interference at joint location facilitates deformation during weld process, but is not essential. The process bonds metals and creates solid-state joints without requiring filler welding material through the heating and deformation of mating surfaces. DRW allows the joining of not only similar, but also dissimilar materials (specifically metals), providing designers with the ability to create lean structural assemblies by using tubular components. For example, contoured sheet metals can be welded to tubes.

DRW thus provides for more control over dimensions (in particular, DRW can be utilized to obtain a predictable post-weld member length) and can be used to create leak-tight joints that are capable of holding fluids or gases under pressure and heat. These joints can have strength exceeding that of the parent metals. The DRW process can reduce the cycle time (which is independent of joint size in DRW) and the cost it takes to make a variety of structures that involve hollow members such as airbag inflators, as will be described herein. The improved resistance welding method increases design flexibility and efficiency while helping to cut cost, investment, and part weight. Examples of deformation welding techniques are described in detail in U.S. patent application Ser. No. 10/253,099, published as Pub. No. 2004/0056001 on Mar. 25, 2004, U.S. patent application Ser. No. 10/914,837, published as Pub. No. 2005/0006352 on Jan. 13, 2005, and U.S. patent application Ser. No. 11/370,427, published as Pub. No. 2006/0231597 on Oct. 19, 2006, the disclosures of which are incorporated herein by reference.

Figure 1:
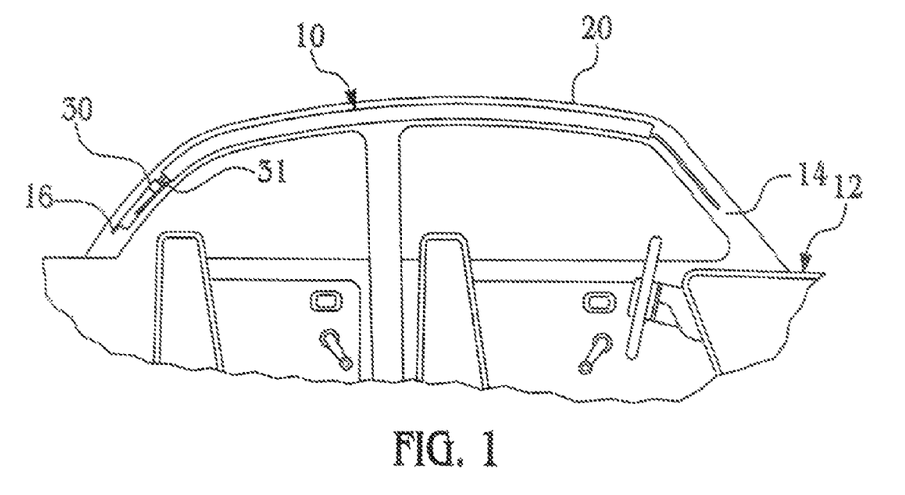
FIG. 1 is a side elevational view of an inflatable cushion in a stored position.

Referring now to FIG. 1, a non-limiting exemplary embodiment of a side airbag or inflatable cushion 10 mounted to a vehicle 12 in a stored or non-deployed state is illustrated. In exemplary embodiments, side airbag modules can comprise inflatable cushions or curtains that traverse a side portion of the vehicle when they are deployed in accordance with a predetermined activation event. Generally, such a device is located along a side of the vehicle in an uninflated state and, upon activation, deploys an inflatable curtain along a side portion of the vehicle. Side impact airbags or inflatable cushions are often mounted in close proximity to the vehicle's roof rail, doorframe, center pillars, or, in some instances, within the side door. Accordingly, the space or housing for the uninflated airbag is typically compact and extends or traverses along the window area or frame.

In the exemplary embodiment illustrated in FIG. 1, vehicle 12 comprises a front pillar 14, a rear pillar 16, and, if the vehicle is so equipped (for example, it has more than one door per side), a center pillar or pillars 18. Such pillars are commonly referred to as A, B, C and D pillars. Inflatable cushion 10 is stored and mounted on or proximate to a vehicle roof rail 20 beneath a headliner.

As illustrated, the rear portion of inflatable cushion 10 is in fluid communication with a gas generator or inflator 30 positioned to provide an inflation gas to inflate inflatable cushion 10 via a diffuser tube 31 having a plurality of diffuser openings disclosed therein. It should, of course, be understood that as applications may vary, the inflator may be positioned in other locations than those illustrated in the present exemplary embodiment. For example, the inflator may be located in a position farther forward in the vehicle such as the door pillar, the front pillar, or another location or locations. In addition, diffuser tube 31 may be configured to extend through a portion of the inflatable cushion, wherein a plurality of openings is positioned in the diffuser tube that traverses through an interior portion of the inflatable cushion. Thus, the presented location is provided as an example and the present invention is not intended to be limited by the same. In an alternative exemplary embodiment, the inflator may be remotely located and a conduit or other fluid providing means used to supply the inflating gas from the inflator to the inflatable cushion.

In exemplary embodiments, inflatable cushion 10 may be comprised of any airbag material suitable for holding gas. For example, the inflatable cushion can comprise two sheets of woven nylon fabric lined with urethane or other substantially impervious material such as silicone. The two urethane coated nylon sheets in this exemplary embodiment are secured to one another along an outer periphery thereof to define the overall airbag shape. Prior to deployment, the inflatable cushion is stored in a compartment mounted to roof rail 20 or proximate to the roof rail as shown in FIG. 1. To store inflatable cushion 10 in the compartment, the uninflated cushion is folded into a configuration that allows it to occupy a small discrete area within the vehicle interior.

Figure 2:
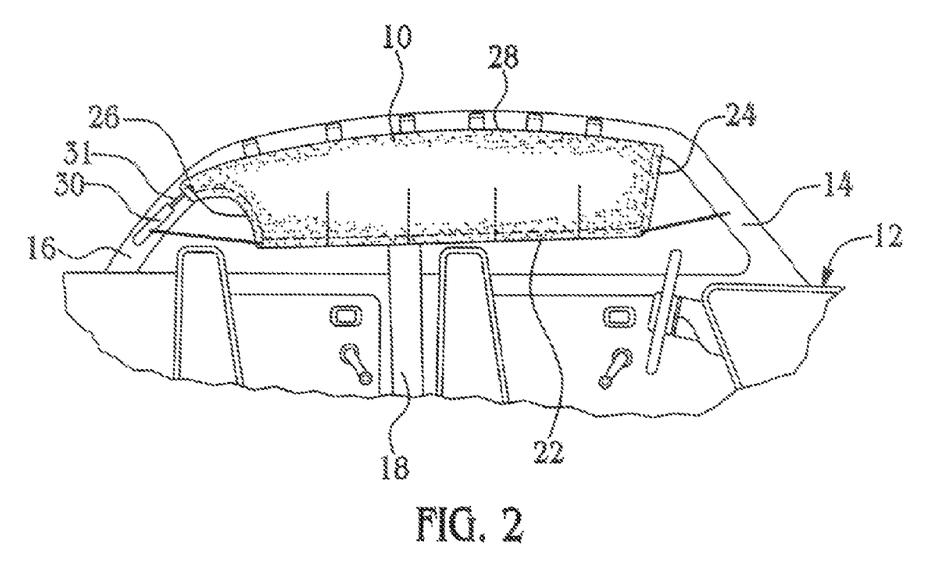
FIG. 2 is a side elevational view of an inflatable cushion in a deployed state.

FIG. 2 illustrates an exemplary embodiment of inflatable cushion 10 in an inflated or deployed state. As illustrated in FIG. 2, inflatable cushion 10 comprises a deploying edge 22, which comprises the bottom portion of the inflatable cushion that traverses across the window openings or window frames of the vehicle. Inflatable cushion 10 also comprises a forward edge 24, a rearward edge 26 and a fixed edge 28. Fixed edge 28 represents the portion of inflatable cushion 10 that remains in substantially the same position regardless of whether the inflatable cushion is deployed or not.

Many different types of airbags or inflatable cushion arrangements (for example, internal cavities, tethers, and/or seams) can be used with exemplary embodiments of the present invention. Therefore, it should be understood that the configuration of inflatable cushion 10 may vary and that the illustrations in FIGS. 1 and 2 are provided as non-limiting exemplary embodiments. The present invention is not intended to be limited to the specific configurations provided herein in the exemplary embodiments, as they are considered ancillary to the present invention.

Figure 3:
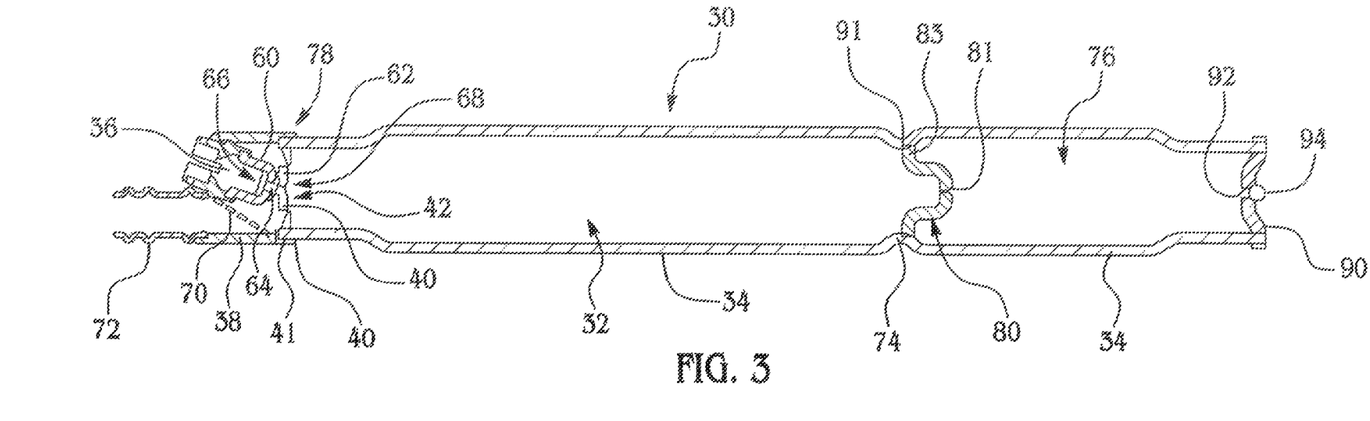
FIG. 3 is a cross-sectional view of an inflator constructed in accordance with an exemplary embodiment of the present invention.

Referring now to FIG. 3, an exemplary embodiment of a side airbag inflator 30 is illustrated. Inflator 30 comprises a longitudinally extending, generally annular inflation housing 34, a divider plate 80, an initiator 36, and an external closure assembly 78. Divider plate 80 is secured within inflation housing 34 to define and partition a first inflation chamber 32 and a second inflation chamber 76 within the inflation housing.

Closure assembly 78 of the present exemplary embodiment includes a longitudinally extending, generally annular closure housing 38, an annular outlet plate 40 that is joined to the closure housing and secured to inflation housing 34 at one end of first inflation chamber 32, and a burst disk 44. Outlet plate 40 defines an outlet opening 42 that is sealed by a burst disk 44 that can comprise a thin metal membrane in exemplary embodiments. As illustrated in FIG. 3, initiator 36 is mounted within closure assembly 78.

Figure 4:
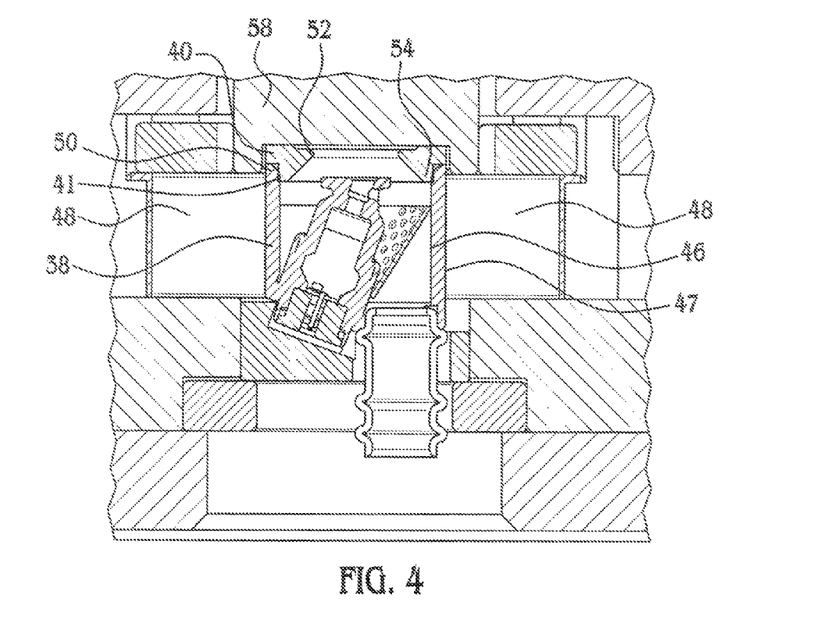
FIG. 4 is a cross-sectional view of an exemplary apparatus after forming a deformation resistance weld between a closure housing and an outlet plate of a closure assembly in accordance with an exemplary embodiment of the present invention.

In the present exemplary embodiment, closure housing 38 is joined to outlet plate 40 using DRW techniques, as illustrated in FIG. 4, to form a deformation resistance weld joint 41. Closure housing 38 is generally annular and has an inside and an outside surface 46, 47. Closure housing 38 also includes an upper end flange 50 longitudinally extending from outside surface 47 of the housing toward outlet plate 40.

Outlet plate 40, as shown in FIG. 4, is formed with a burst disk flange 52 that extends radially inwardly in a direction generally transverse to the annular wall of closure housing 38. Burst disk flange 52 is configured to engage burst disk 44 so that the burst disk will extend generally transversely to closure housing 38 within the annulus of outlet plate 40. Outlet plate 40 is also formed with a lower end flange 54 extending longitudinally from burst disk flange 52 in a direction generally opposed to upper end flange 50 of closure housing 38. Lower end flange 54 is offset radially inwardly in a direction generally transverse to upper end flange 50 of closure housing 38 to define a recess 56 below the outside portion of outlet plate 40.

Figure 5:
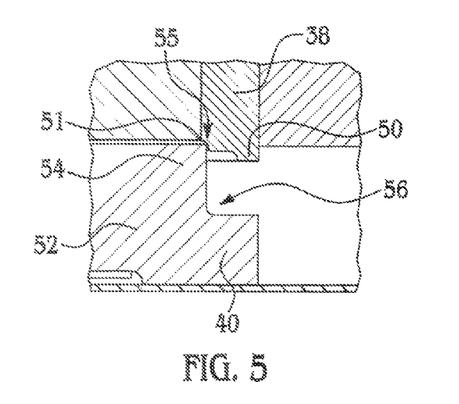
FIG. 5 is a partial cross-sectional view of the closure housing and the outlet plate of FIG. 4 before the exemplary deformation resistance weld is formed.

Inside surface 46 and upper end flange 50 of closure housing 38 and the wall of outlet plate 40 adjacent to recess 56 respectively define the respective joining (that is, mating or joining) surfaces of weld joint 41 between the closure housing and the outlet plate. During the welding process, which is sequentially illustrated in FIGS. 5 and 6, outside surface 47 of closure housing 38 is longitudinally aligned with the outside surface of outlet plate 40. As best seen in FIG. 5, however, the transverse width of the annular wall of closure housing 38 is greater than the transverse width of recess 56 of outlet plate 40 at the outset of the welding process. This differential provides for diametrical interference in the mating parts to permit deformation and sliding of the mating surfaces along each other during the weld process. In the present exemplary embodiment, the upper end of inside surface 46 of closure housing 38 is provided with an angled chamfer 51 for engaging lower end flange 54 of outlet plate 40 to prevent shorting during initiation of the welding process. In the present exemplary embodiment, angled chamfer 51 is provided with a relatively sharp corner 55 to provide for high current density at the initiation of the welding process.

With upper end flange 50 inserted into recess 56 and angled chamfer 51 contacting lower end flange 54 of outlet plate 40, as described above and shown in FIG. 5, weld joint 41 can then be formed between closure housing 38 and the outlet plate. During the welding process, a test plate may be provided to extend transversely within the annulus of outlet plate 40 and simulate the positioning of burst disk 44 in the completed inflator assembly. The test plate may be configured to have an interstitial region to simulate the electrode footprint in burst disk 44.

Figure 6:
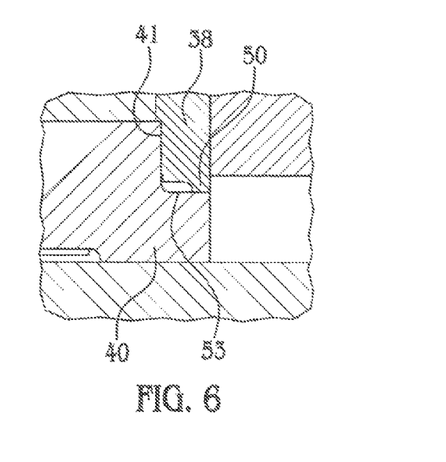
FIG. 6 is a partial cross-sectional view of the closure housing and the outlet plate of FIG. 4 after the exemplary deformation resistance weld is formed.

In the present exemplary embodiment, weld joint 41 is formed by sliding inside surface 46 of closure housing 38 along lower end flange 54 of outlet plate 40 while forcing the two components against each other under sufficient pressure to form an interference fit. As shown in FIG. 6, the welding process is complete at a point at which upper end flange 50 engages outlet plate 40. In this position, as shown in FIG. 6, the space between upper end flange 50 and lower end flange 54 forms an expulsion or flash trap 53, which is designed to improve the quality or the cleanliness of weld joint 41 by preventing weld flash from reaching the inner diameter of the functioning area of weld joint 41.

To perform the welding process described above, inside surface 46 of closure housing 38 is compressed against lower end flange 54 of outlet plate 40 by engaging the housing with a first electrode 48, and applying pressure against the housing with the first electrode in a first direction generally perpendicular to the annular wall of the housing, while simultaneously engaging the outlet plate with a second electrode 58, and applying pressure against the outlet plate with the second electrode in a direction perpendicular the first direction. The interference fit is formed by applying sufficient pressure through first and second electrodes 48, 58 and moving at least one of the electrodes toward the other electrode, while resistance welding together inside surface 46 of closure housing 38 and lower end flange 54 of outlet plate 40, by applying an electrical current between the electrodes for resistance heating the housing and the outlet plate to a temperature at which a metallurgical bond is formed between the joining surfaces. Pressure and electrical current can be maintained at a level and for a period of time sufficient to substantially soften closure housing 38 and outlet plate 40 and allow a portion of the softened material of the housing to flow into the interference juncture and weld the two parts together. In this manner, the softened material can be forced to flow through a relatively lengthy juncture, and the components to be joined can be maintained at an optimum temperature for ensuring that a complete and high quality weld is formed.

Further, in exemplary embodiments, it may be advantageous apply pressure and a first level of electrical current flow through closure housing 38 and outlet plate 40 for a first period of time, for softening the housing by electrical resistance heating and causing the softened housing to deform against the outlet plate, under the pressure exerted by first and second electrodes 48, 58, followed by the application of a second level of electrical current, higher than the first level of current, for a second period of time sufficient to at least partially melt the housing, and form deformation resistance weld joint 41 between the housing and the outlet plate.

It should be appreciated that for a joint of this type, the ability to slide inside surface 46 of closure housing 38 along lower end flange 54 of outlet plate 40 using DRW techniques eliminates the close tolerance machining required in prior joining methods, simplifies the form with which recess 56 can be provided, and considerably simplifies, facilitates, and decreases the cost of both construction and operation of the equipment used to make the joint. For instance, in the exemplary embodiment described, the point at which upper end flange 50 contacts outlet plate 40 controls the length of weld joint 41. Alternatively, stops for first and second electrodes 48, 58 may be precisely designed for even more precise control of the finished part length to make the performance of the inflator more repeatable. For instance, in exemplary embodiments, the transverse width of the annular wall of closure housing 38 and the length of weld joint 41 can be substantially equivalent to provide for increased weld strength. In addition, the use of DRW techniques can provide for a reduced cycle time, much improved weld strength and durability, and a decreased the heat effect in the parent metals caused by weld heat by providing the ability to heat treat the components in the weld strength.

Referring again to FIG. 3, after closure housing 38 and outlet plate 40 have been welded together as described above, a wedge support member 60 and a movable wedge member 62 are disposed between burst disk 44 and initiator 36. Support member 60 surrounds a portion of initiator 36. In accordance with the present exemplary embodiment, wedge member 62 is wedged between burst disk 44 and support member 60. In addition, a projectile or pin 64 is received in an opening 66 of support member 60. Pin 64 is also partially received within an opening 68 in wedge member 62 to maintain the pin in its supporting position between burst disk 44 and support member 60.

In operation of the present exemplary embodiment, when initiator 36 is activated, pin 64 will stroke or travel away from support member 60 and through opening 68 in wedge member 62 to release the wedge member from its supporting position. Pin 64 will then make contact with, and thereby rupture, burst disk 44, releasing the gas of first inflation chamber 32 through outlet opening 42. In an alternative exemplary embodiment, pin 64 may be used solely for releasing wedge member 62, in which case the movement of the wedge member from its supporting position allows burst disk 44 to rupture.

During this activation event, wedge member 62 travels downwardly towards a screen member 70. Screen member 70 is positioned to retain and/or prevent debris from exiting through an outlet conduit 72 of the housing (in particular, debris from wedge member 62 and portions of burst disk 44). In the present exemplary embodiment, outlet conduit 72 is configured to provide fluid communication between first inflation chamber 32 and an inflatable cushion (not shown) after initiator 36 has been activated and burst disk 44 has been removed from outlet opening 42.

In the present exemplary embodiment, initiator 36 is angularly configured such that a surface of support member 60 locates or supports wedge member 62 between the support member and a portion of burst disk 44 when the initiator is in an un-activated state, as shown in FIG. 3. Furthermore, this arrangement allows wedge member 62 to support burst disk 44 as it retains the pressurized gas within the first inflation housing.

Wedge member 62 can further comprise another opening that is configured to allow inflation gases to pass therethrough to allow for the controlled release of the inflator gas under extreme temperatures and pressures. It should, of course, be understood that wedge member 62 may have various configurations, and exemplary embodiments of the present invention are not limited to the specific configurations of wedge member 62 as illustrated and described in accordance the present exemplary embodiment.

In the present exemplary embodiment, as illustrated in FIG. 3, inflation housing 34 is integrally formed and includes a notch 79 that extends radially into the intersection of first and second inflation chambers 32, 76. Second inflation chamber 76 comprises a substantially smaller volume for holding a second amount of inflation gas, which is to be provided into first inflation chamber 32 and, ultimately, through outlet opening 42 via an output orifice 81 disposed in divider plate 80, which is secured to notch 79 to provide fluid communication between the first inflation chamber and second inflation chamber 76. Divider plate 80 is formed with output orifice 81 extending longitudinally into second inflation chamber 76 and an annularly shaped flange 83 extending generally transversely to longitudinal axis 82.

Figure 7:
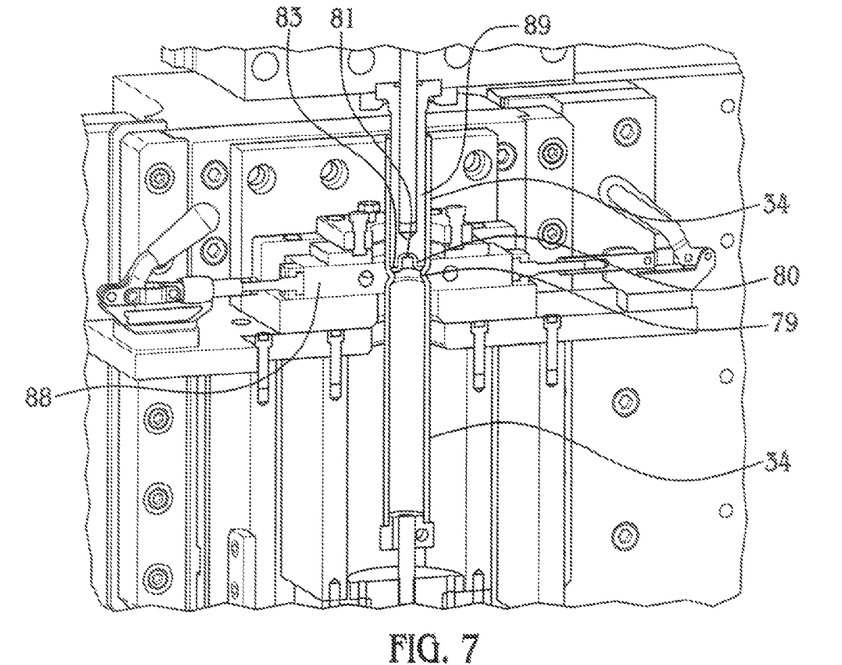
FIG. 7 is a cross-sectional view of an exemplary apparatus prior to forming a deformation resistance weld between an outer housing and a divider plate of an inflator in accordance with an exemplary embodiment of the present invention.
Figure 8:
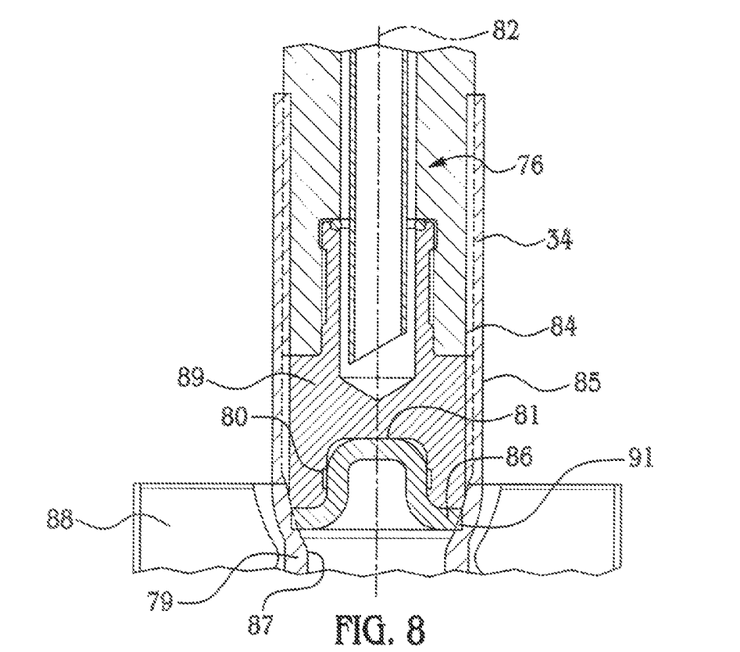
FIG. 8 is a partial cross-sectional view of the exemplary apparatus of FIG. 7 after forming the deformation resistance weld between the outer housing and the divider plate of the inflator in accordance with an exemplary embodiment of the present invention.
Figure 9:
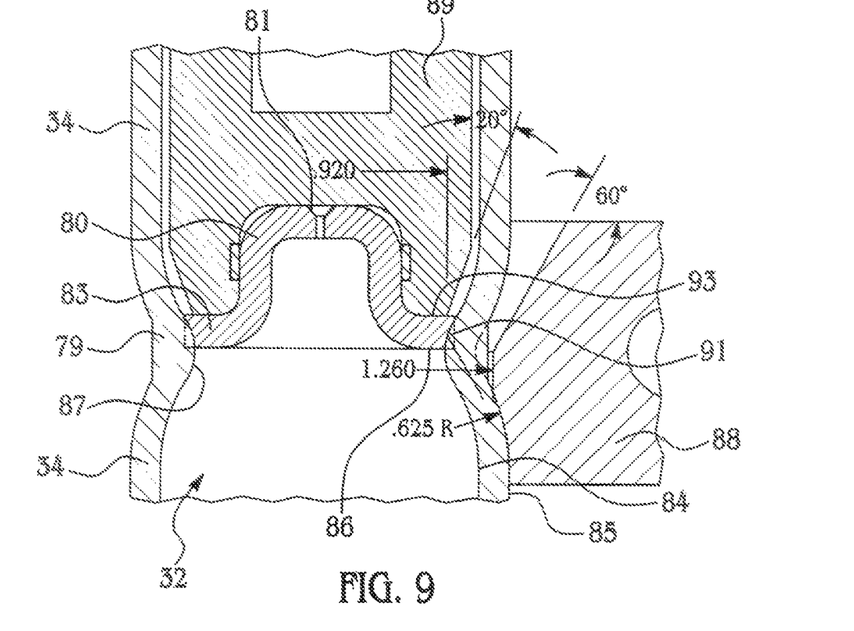
FIG. 9 is a partial cross-sectional view of the outer housing and the divider plate of FIGS. 7 and 8 after the exemplary deformation resistance weld is formed.

In the present exemplary embodiment, divider plate 80 is joined to notch 79 using DRW techniques, as illustrated in FIGS. 7-9, to form a deformation resistance weld joint 91. Inflation housing 34 has an inside and an outside surface 84, 85 and defines a longitudinal axis 82. Notch 79 is shaped as a depression that extends radially inwardly within inflation housing 34 in a generally transverse direction to longitudinal axis 82.

A lower surface 86 of annular flange 83 of divider plate 80 and an inner surface 87 of notch 79 proximate to second inflation chamber 76 define the respective joining surfaces of weld joint 91. The depression of notch 79 extends in a direction generally parallel to the joining surfaces, both prior to and after resistance welding divider plate 80 and notch 79 together.

With lower surface 86 of annular flange 83 and inner surface 87 of notch 79 on the side of second inflation chamber 76 contacting one another, as described above and depicted in FIGS. 7 and 8, weld joint 91 is formed by forcing notch 79 against annular flange 83 and welding them together to the point shown in FIG. 9. Notch 79 is compressed against annular flange 83 by engaging the notch with a first electrode 88 and applying pressure against the notch with the first electrode in a first direction generally transverse to longitudinal axis 82, while simultaneously engaging divider plate 80 with a second electrode 89, and applying pressure against the divider plate with the second electrode in a generally longitudinal direction perpendicular to the first direction. Notch 79 and annular flange 83 are abutted against one another by applying sufficient pressure through first and second electrodes 88, 89, and moving at least one of the electrodes toward the other electrode, while resistance welding together the notch and the annular flange.

The resistance welding is accomplished by applying an electrical current between the electrodes for resistance heating of notch 79 and divider plate 80 to a temperature at which a metallurgical bond is formed at between the respective joining surfaces 86, 87 and within the depression of the notch. Pressure and electrical current can be maintained at a level and for a period of time sufficient to substantially soften notch 79 and annular flange 83 and force the softened material into the interference juncture between the two parts. In this manner, the softened material can be forced to flow through a fairly long juncture, and the components to be joined can be maintained at an optimum temperature for ensuring that a complete and high quality weld is formed. The depression of notch 79 can improve the quality or the cleanliness of weld joint 91 by preventing weld flash from reaching the inner diameter of the functioning area of the weld joint.

Further, in exemplary embodiments, it may be advantageous apply pressure and a first level of electrical current flow through notch 79 and annular flange 83 for a first period of time, for softening the annular flange by electrical resistance heating and causing the softened flange to deform against the notch, under the pressure exerted by first and second electrodes 88, 89, followed by the application of a second level of electrical current, higher than the first level of current, for a second period of time sufficient to at least partially melt the annular flange, and form deformation resistance weld joint 91 between the notch and the flange.

By utilizing DRW techniques, the present exemplary embodiment makes it unnecessary to use two separate chambers when welding divider plate 80 and thus requires just a single weld joint instead of multiple weld joints. That is, inflation housing 34 can be integrally formed as described above and shown in FIGS. 7-9, thereby reducing part costs and weight. It should further be appreciated that, for a joint of this type, the ability to deform the outer diameter of annular flange 83 within notch 79 using DRW techniques eliminates the close tolerance machining required in prior joining methods and considerably simplifies, facilitates, and decreases the cost of both construction and operation of the equipment used to make the joint. In the present exemplary embodiments, stops for the electrodes may be precisely designed for precise control of the finished part length to make the performance of the inflator more repeatable. In addition, the use of DRW techniques can provide for a reduced cycle time, much improved weld strength and durability, and a decreased the heat effect in the parent metals caused by weld heat by providing the ability to heat treat the components in the weld strength.

Figure 10:
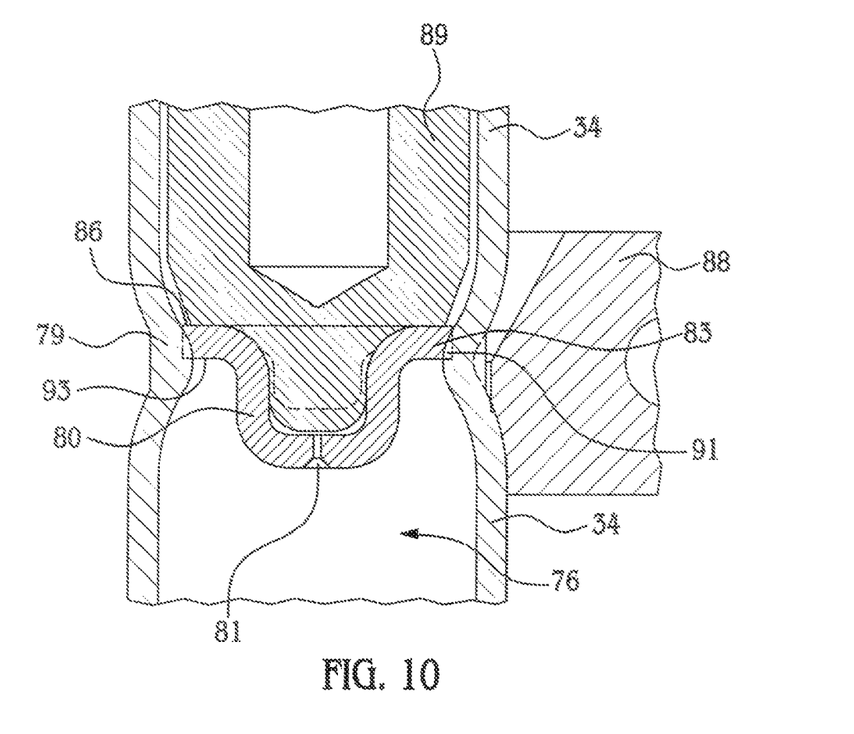
FIG. 10 is a partial cross-sectional view of the outer housing and the divider plate of FIGS. 7 and 8 after an alternative exemplary deformation resistance weld is formed.

In the exemplary embodiment illustrated in FIGS. 7-9, divider plate 80 is formed with output orifice 81 extending longitudinally into second inflation chamber 76 so that lower surface 86 of annular flange 83 and inner surface 87 of notch 79 on the side of the second inflation chamber contact one another at the outset of the welding process. As illustrated in FIGS. 7 and 8, such an arrangement is provided for by longitudinally extending second electrode 89 within second inflation chamber 76 while applying pressure against the notch with first electrode 88 in a direction generally transverse to the second electrode. The geometry of this exemplary embodiment can provide for better mechanical strength of divider plate 80 in withstanding burst pressure during initiation. In an alternative exemplary embodiment, divider plate 80 can be formed with output orifice 81 extending longitudinally into first inflation chamber 32 so that upper surface 93 of annular flange 83 and inner surface 87 of notch 79 proximate to the first inflation chamber contact one another at the outset of the welding process, as illustrated in FIG. 10. This alternative geometry provides for improved contact between second electrode 89 and divider plate 80 for improved electrode life in manufacturing, and can be provided for by longitudinally extending second electrode 89 within first inflation chamber 32 while applying pressure against the notch with first electrode 88 in a direction generally transverse to the second electrode.

Referring once again to FIG. 3, exemplary inflator 30 also includes an end plate 90 disposed at an end of inflation housing 34 opposed to closure assembly 78. End plate 90 is configured with a fill passageway 92 and a sealing means 94 secured therein after a predetermined volume of inflation gas is supplied to first and second inflation chambers 32, 76. In exemplary embodiments, fill passageway 92 may be either closed or plugged in any fashion that allows first inflation chamber 32 to be filled with a first compressed volume of inflation gas and sealed. In non-limiting exemplary embodiments, the gas stored in first and second inflation chambers 32, 76 can comprise argon, helium, carbon dioxide, nitrogen, or equivalents or mixtures thereof.

In exemplary embodiments, initiator 36 can be electrically coupled to a sensing and diagnostic module (not shown) that is configured to receive and interpret signals from a plurality of vehicle sensors to determine whether an activation signal is to be sent to the initiator. In accordance with the present exemplary embodiment, initiator 36 is received within an initiator retainer 96 that may comprise a portion of closure housing 38. Initiator retainer 96 helps position initiator 36 so that, upon receipt of such an activation signal, initiator 36 will fire, causing pin 64 to stroke and rupture burst disk 44. Wedge member 62 will then be free to move, thereby allowing the gas from first and second inflation chambers 32, 76 to pass through outlet conduit 72.

As illustrated in FIG. 3, outlet opening 42 is substantially larger than output orifice 81 in the present exemplary embodiment. As a result, the inflation output from second inflation chamber 76 is at a substantially lower flow rate for an extended period of time. This time period substantially longer than the period of time for the inflation gases to flow out of first inflation chamber 32. Therefore, in accordance with the present exemplary embodiment, first inflation chamber 32 is used to provide an initial output for initially deploying and inflating the inflatable cushion, while second inflation chamber 76 is used to provide a secondary or supplemental inflation output during and after the initial inflation of the inflatable cushion. The output of second inflation chamber 76 is configured to counteract the leakage of the inflation gases from the inflatable cushion during initial deployment period. In other words, to provide an extended period of inflation of the inflatable cushion, first inflation chamber 32 is used to provide an initial inflation output to deploy the inflatable cushion into a desired inflated configuration, and thereafter any leakage of the inflation gases used to inflate the inflatable cushion are counteracted by the supplemental inflation output of second inflation chamber 76 as smaller output orifice 81 allows the supplemental inflation to be provided over a longer time period than is typical for release of all the gases in a single stage inflator.

During operation of inflator 30 of the present exemplary embodiment, the external support member 60 for metal membrane or burst disk 44 begins positioned at an angle to initiator 36, as described above. Upon being activated, initiator 36 pressurizes a chamber behind the pin that causes to the pin to stroke and release wedge member 62. Thereafter, the pressure load on burst disk 44 creates a resultant force on wedge member 62 that pushes the wedge member to the side away from the burst disk. Burst disk 44 then ruptures, allowing gas to exit, and screen member 70 captures wedge member 62.

Figure 11:
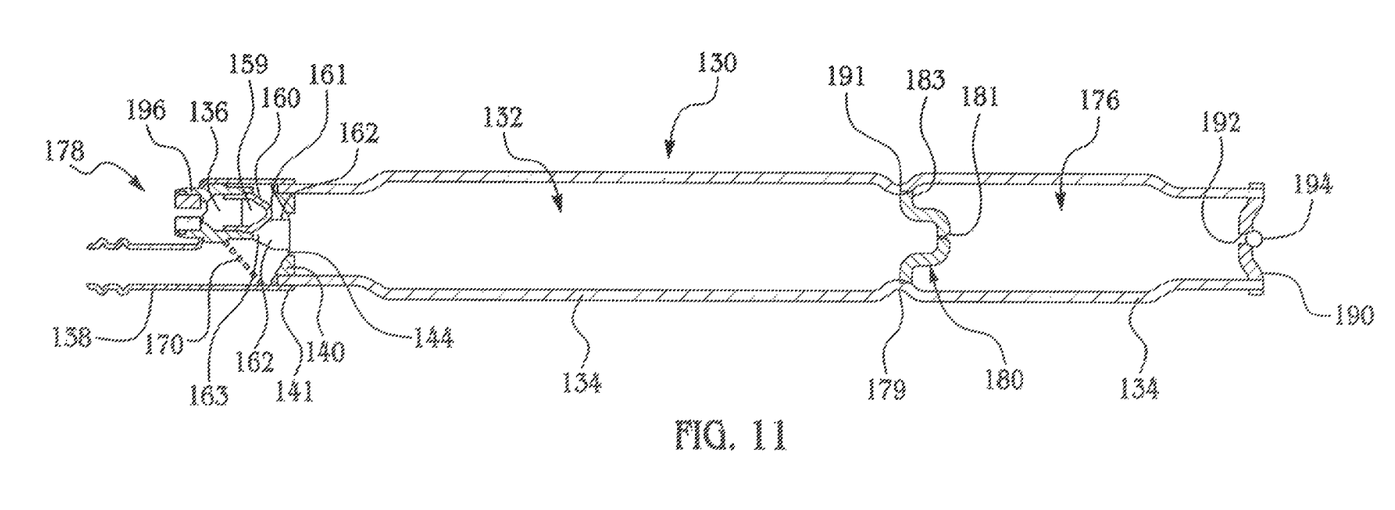
FIG. 11 is a cross-sectional view of an inflator constructed in accordance with an alternative exemplary embodiment of the present invention.

Referring now to FIG. 11, an alternative exemplary embodiment of an inflator manufactured in accordance with the present invention is shown. In exemplary inflator 130, component parts performing similar or analogous functions to those in the exemplary embodiment described with regard to FIG. 3 above are labeled in multiples of 100.

In the present exemplary embodiment, a metal membrane or burst disk 144 and a wedge member 162 of a closure assembly 178 are located on a center axis of inflator 130. Wedge member 162 is attached directly to burst disk 144 and also contacts a narrow tip 161 of an initiator support cap 160 off-center on a parallel axis. In this embodiment, support cap 160 is located over initiator 136. During activation of initiator 136, a chamber 159 behind support cap 160 is pressurized, causing the support cap to stroke and contact wedge member 162, thereby imparting axial and radial forces on the wedge member. The component forces of support cap 160 operate to move wedge member 162 so that burst disk 144 is unsupported and accordingly ruptures to allow the gas to exit. Thereafter, a screen member 170 captures burst disk 144. In exemplary embodiments, wedge member 162 may be fixedly secured to burst disk 144 or merely supported on the burst disk by support cap 160.

In accordance with the present exemplary embodiment, closure housing 138 is joined to outlet plate 140 using DRW techniques in the same manner as the analogous parts of the exemplary embodiment of FIG. 3. Additionally, divider plate 180 is joined to notch 179 using DRW techniques in the same manner as the analogous parts of the exemplary embodiment of FIG. 3. Exemplary embodiments of these methods are described above and illustrated in FIGS. 4-10.

In the present exemplary embodiment, support cap 160 and wedge member 162 are disposed between burst disk 144 and initiator 136. Support cap 160 defines chamber 159 to be in fluid communication with initiator 136. Wedge member 162, which is located adjacent to and wedged between burst disk 144 and support cap 160, has an outer periphery or diameter that is less than the outer periphery or diameter of the burst disk. As illustrated in FIG. 11, tip 161 of support cap 160 is disposed off axis, but parallel, to a tip 163 of wedge member 162. Of course, other configurations (such as, for example, non-parallel tips 161, 163) are contemplated in alternative exemplary embodiments.

During operation of the present exemplary embodiment, when initiator 136 is activated, the pressure in chamber 159 behind support cap 160 increases to cause the support cap to stroke away from the initiator. This causes tip 161 of support cap 160 to act on tip 163 to dislodge wedge member 162, thereby causing the wedge member to travel away from burst disk 144. Thereafter, burst disk 144, no longer supported by wedge member 162, will be allowed to rupture so that the gas of first inflation chamber 148 releases through outlet opening 156.

While the invention has thus far been described above with reference to specific exemplary embodiments of a side airbag inflator comprising a first chamber and a second chamber that are longitudinally aligned, the broader practice of the invention is not necessarily so limited. As such, the present invention is not intended to be limited to the specific exemplary embodiments and configurations illustrated in the Figures and described herein, as they are considered ancillary to the present invention.

Moreover, exemplary embodiments of inflators in accordance with the present invention are contemplated for use with numerous other airbag modules. For instance, in addition to side airbag modules, the inflator may be configured as a component of a driver side airbag module or a passenger side airbag module.

Figure 12:
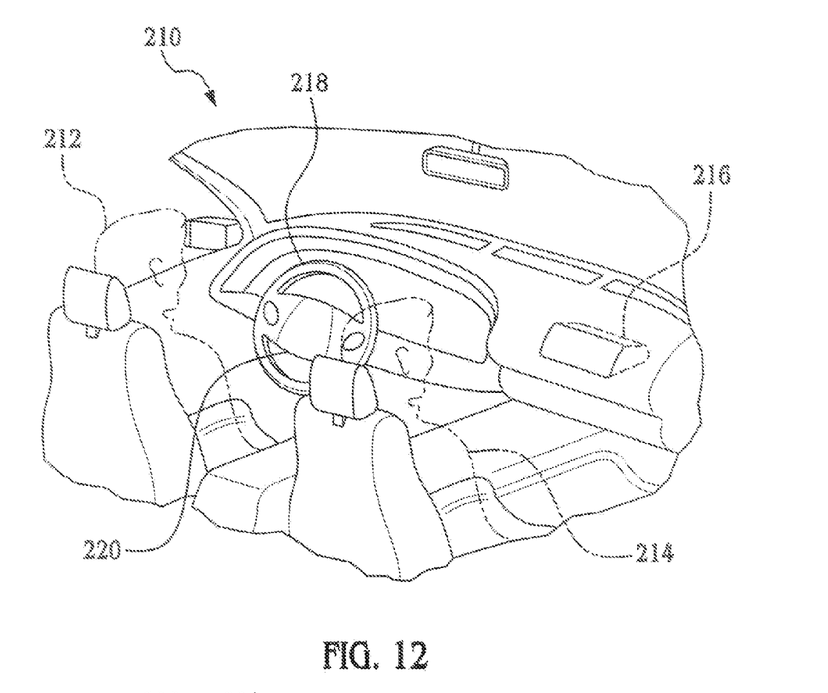
FIG. 12 is a view of the interior of an automotive vehicle incorporating exemplary driver side and passenger side air bag modules.

Reference will now be made to FIG. 12, in which the interior of an exemplary vehicle 210 for transporting an operator 212 and a passenger 214 is illustrated. Vehicle 210 may include a driver side airbag module 220 mounted within the steering wheel 218 for protection of vehicle operator 212. Vehicle 210 can also include a passenger side airbag module 216 mounted within the dash panel in substantially opposing relation to vehicle passenger 214. Activation of airbag modules 216, 220 typically takes place upon the occurrence and measurement of predetermined vehicle conditions such as deceleration at a rate exceeding a predetermined value.

Figure 13:
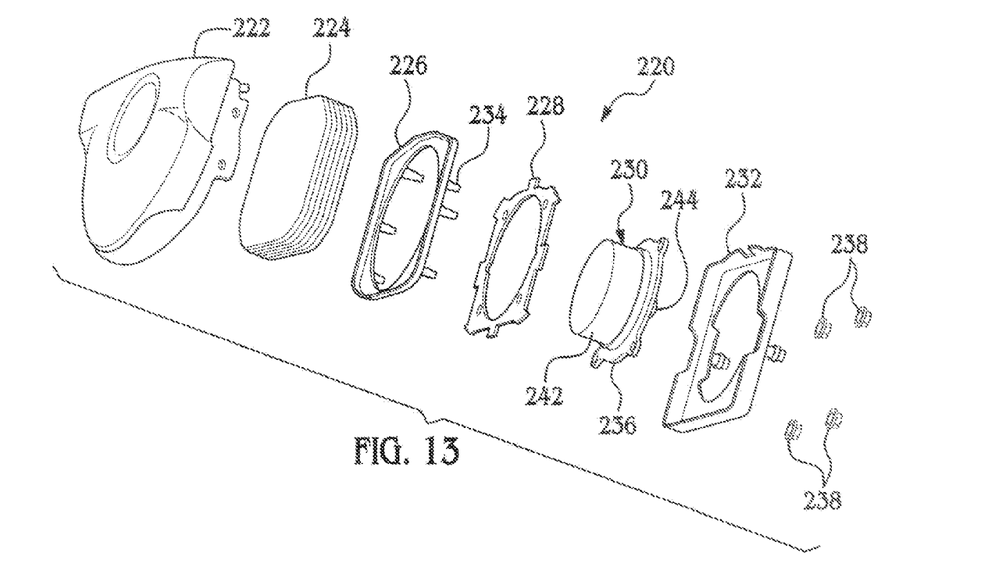
FIG. 13 is an exploded perspective view of an exemplary driver side airbag module.

Referring now to FIG. 13, an exemplary embodiment of an assembly for driver side airbag module 220 is illustrated. Airbag module 220 is suitably mounted to a central hub or armature of a steering wheel. Typically, some form of mounting mechanism will be provided to mount the airbag module assembly components to each other and to the steering wheel.

Airbag module 220 includes a cover plate 222, an inflatable airbag cushion 224, an annular cushion ring 226, an annular cover retainer 228, an inflator 230, and an annular retaining plate or pad retainer plate 232. Typically, cushion ring 226 is formed from metal and secured to one side of an inflator opening of airbag cushion 224, while cover retainer 228, which is also formed from metal, is disposed on the other side of the inflator opening. Thus, a periphery of the inflator opening of airbag cushion 224 is disposed between cushion ring 226 and cover retainer 228, and the two are drawn together by tightening of a plurality of nuts 238 about a plurality of threaded bolts 234 passing through openings in the cushion ring, the periphery of the inflation opening of the inflatable cushion, and the cover retainer. In other exemplary configurations, cushion ring 226 can be secured to cover retainer 228 by a plurality of bolts 234 passing through openings in the cushion ring, the cover retainer, and retaining plate 232. Thereafter, plurality of nuts 238 are disposed about threaded bolts 234 to secure the assembly together.

Cushion ring 226 is typically used for mounting/attaching airbag cushion 224 to the airbag module. In other words, cushion ring 226 secures the opening of airbag cushion 224 about a portion of inflator 230 as well as retaining plate 232, which is fixedly secured to the vehicle. In exemplary airbag module assemblies, cushion ring 226 can be a separate metal component that is riveted or bolted together with other adjoining components in the airbag module, such as cover plate 222, so as to merely pinch/squeeze the airbag cushion between the adjoining components. Cover plate 222 is used to secure the airbag module's cover (not shown) in the final assembly.

As illustrated in FIG. 13, airbag module 220 includes an inflator 230 manufactured in accordance with an exemplary embodiment of the present invention. Inflator 230 is configured to generate inflator gas upon the sensing of predetermined vehicle conditions (for example, rapid deceleration) to inflate airbag cushion 224. In exemplary embodiments, inflator 230 can be of any conventional construction for generating inflator gas to inflate the airbag cushion 224, such as a single stage inflator. Inflator 230 has a generally cylindrical housing portion 242 secured to a generally circular base plate 236 that suitably engages with cover retainer 228 and cushion ring 226. A plurality of vent ports 240 are formed in and extend around housing 242 into inflator 230 in a radial manner. Base plate 236 also includes an opening 244 to permit an initiator to extend into inflator 230. It should be understood that the number and dimension of vent ports 240 may be varied according to the precise application and configuration of inflator 230 in particular exemplary embodiments.

In exemplary embodiments of the present invention, housing portion 242 and base plate 236 of inflator 230 are secured to one another using DRW techniques, as illustrated in FIGS. 12 and 13, to form deformation resistance weld joint 278. Housing 242 defines a longitudinal axis 246 and an inside and an outside surface 248, 250 of inflator 230. Base plate 236 extends across a lower end 252 of housing 242 in a generally transverse direction to longitudinal axis 246.

Figure 14:
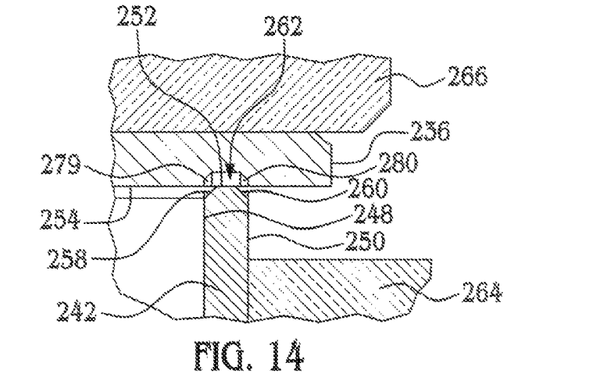
FIG. 14 is a partial cross-sectional view of an exemplary apparatus prior to forming a deformation resistance weld between an inflator housing and a base plate of an inflator assembly in accordance with an exemplary embodiment of the present invention.
Figure 15:
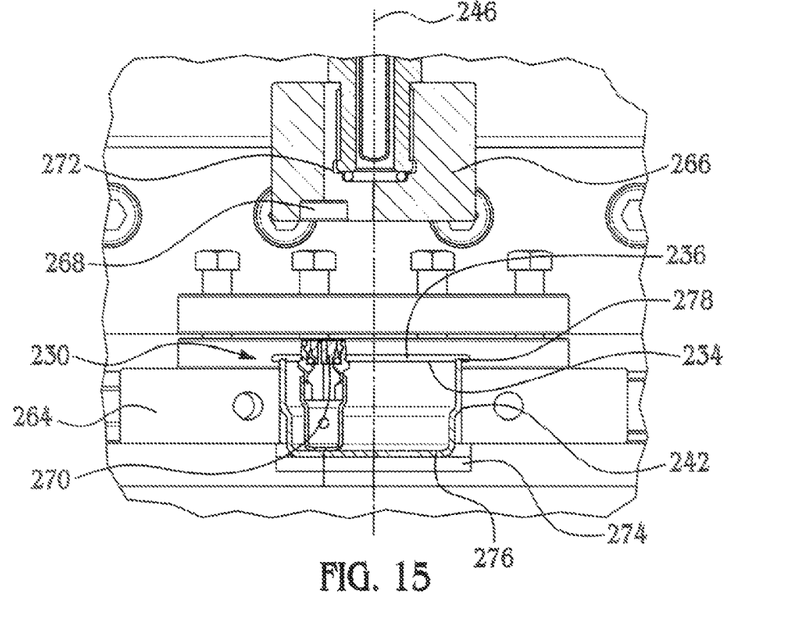
FIG. 15 is a cross-sectional view of the exemplary apparatus of FIG. 14 after forming the deformation resistance weld between the inflator housing and the base plate of the inflator assembly in accordance with an exemplary embodiment of the present invention.

To define the joining surfaces of weld joint 278, lower end 252 of housing 242 is formed with two angled chamfers 258, 260 on inside and outside surfaces 248, 250 respectively, and an upper surface 254 of base plate 236 is formed with an annular groove 262 that is generally concentric with and of a similar diameter to the lower end of the housing. This configuration of the joining surfaces is intended to produce two concentric deformation resistance weld interfaces 279, 280 at the angled chamfers 258, 260 that are welded at the same time, as described below.

As best seen in FIG. 14, at the outset of the welding process, lower end 252 of housing 242 is circumferentially aligned with annular groove 262 of base plate 236. The transverse width of housing 242, however, is greater than the transverse width of annular groove 262 at the outset of the welding process. This differential provides for diametrical interference in the mating parts to permit deformation and sliding of the mating surfaces along each other during the weld process.

With lower end 252 of housing 242 is longitudinally aligned with annular groove 262 of base plate 236, a weld joint 278 can be formed between housing portion 242 and base plate 236. In the present exemplary embodiment, the welded joint is formed by sliding lower end 252 of housing 242 into annular groove 262 while forcing the two components against each other under sufficient pressure to form an interference fit. As shown in FIG. 15, the welding process is complete at a point at which lower end 252 of housing 242 engages the transverse section of annular groove 262.

To perform the welding process described above, lower end 252 of housing 242 is compressed into annular groove 262 by engaging the housing with a first electrode 264, and applying pressure against the housing with the first electrode in a first direction generally perpendicular to the annular housing of inflator 230, while simultaneously engaging base plate 236 with a second electrode 266, and applying pressure against the outlet plate with the second electrode in a direction perpendicular the first direction. In the present exemplary embodiment, second electrode 266 includes a direct water-cooling mechanism 272 to provide for less heat effect in the area of base plate 236 that is not part of weld joint 278. Second electrode 266 also comprises a clearance aperture 268 to receive an initiator 270 where the initiator has been received in opening 244 of base plate 236 prior to welding, as illustrated in FIG. 15. In alternative exemplary embodiments, initiator 270 need not be installed in opening 244 until after welding.

The interference fit is formed by applying sufficient pressure through first and second electrodes 264, 266 and moving at least one of the electrodes toward the other electrode, while resistance welding together lower end 252 of housing 242 and annular groove 262 by applying an electrical current between the electrodes for resistance heating the housing and the outlet plate to a temperature at which a metallurgical bond is formed between the joining surfaces. Pressure and electrical current can be maintained at a level and for a period of time sufficient to substantially soften housing 242 and base plate 236 and force the softened material into the interference juncture between the two parts. In this manner, the softened material can be forced to flow through a fairly long juncture, and the components to be joined can be maintained at an optimum temperature for ensuring that a complete and high quality weld is formed.

Further, in exemplary embodiments, it may be advantageous apply pressure and a first level of electrical current flow through housing 242 and base plate 236 for a first period of time, for softening the housing by electrical resistance heating and causing the softened housing to deform against the base plate, under the pressure exerted by first and second electrodes 264, 266, followed by the application of a second level of electrical current, higher than the first level of current, for a second period of time sufficient to at least partially melt the housing, and form deformation resistance weld joint 278 between the housing and the base plate.

Figure 16:
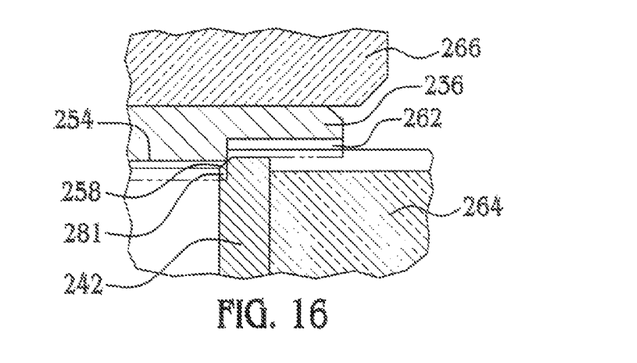
FIG. 16 is a partial cross-sectional view of an exemplary apparatus prior to forming a deformation resistance weld between an inflator housing and a base plate of an inflator assembly in accordance with an alternative exemplary embodiment of the present invention.

It should be appreciated that for a joint of this type, the ability to slide lower end 252 of housing 242 into annular groove 262 using DRW techniques eliminates the close tolerance machining required in prior joining methods, simplifies the form with which the annular groove can be provided, and considerably simplifies, facilitates, and decreases the cost of both construction and operation of the equipment used to make the joint. For instance, as illustrated in FIG. 15, the welding mechanism can be provided with an insulation plate 274 disposed adjacent to an upper surface 276 of inflator 230 to control the proximity of base plate 236 to first electrode 264 during welding. Alternatively, stops for the electrodes may be precisely designed to provide for more precise control of the finished part length and thereby make the performance of the inflator more repeatable. Moreover, in alternative exemplary embodiments, annular groove 262 of base plate 236 may instead be provided as an interstitial annular groove that extends to the periphery of upper surface 254 of the base plate, as illustrated in FIG. 16, so that only a single deformation resistance weld interface 281 is formed between a single angled chamfer 258 on inside surface 248 of housing 242 and upper surface 254 of the base plate. This configuration can provide for weld joints of a single-sided geometry that may be adequately strong for the intended service, while permitting for improved contact between the electrodes and outside surfaces of the mating components. In other alternative exemplary embodiments, angled chamfers 258, 260 and/or annular groove 262 having unequal geometries so that two unequal, concentric weld interfaces. In addition, the use of DRW techniques can provide for a reduced cycle time, much improved weld strength and durability, and a decreased the heat effect in the parent metals caused by weld heat by providing the ability to heat treat the components in the weld strength.

Referring back to FIG. 13, in response to a sudden deceleration of the vehicle, a controller such as a sensing and actuating system (not shown) provides an ignition signal to the initiator to initiate deployment inflation of the airbag cushion 224. Upon actuation of the initiator in response to the ignition signal, inflator 230 discharges an appropriate volume of gas from vent ports 240 into airbag cushion 224.

Exemplary inflator 230 is described above and illustrated in FIG. 13 as a component of a driver side airbag module for installation in a driver side of a vehicle to protect the driver thereof. It should be recognized, however, that inflator 230 can be a component of other passive restraints in alternative exemplary embodiments. For instance, inflator 230 can be a component of a passenger side airbag module that can be mounted within a vehicle's dash panel in exemplary embodiments, such as airbag module 216 shown in FIG. 12, for protection of an occupant in the vehicle's passenger seat.

It should be recognized that the present invention is not intended to be limited to the specific configurations provided in the exemplary embodiments described above and illustrated in the drawings, as they are considered ancillary to the present invention. That is, the scope of the present invention encompasses many other vehicle configurations and inflator arrangements in alternative embodiments. For example, the vehicle may include three rows of seats such as, but not limited to, sports utility vehicles, station wagons, and vans or minivans. Alternatively, the vehicle may comprise only a single row of seats such as, but not limited to, sports coups. Therefore, exemplary embodiments of an airbag inflator in accordance with the present invention may be easily modified to accommodate all types of vehicles and airbag module assemblies in several different types of configurations.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An assembly comprising:
a first generally tubular member; and
a second member configured for at least partial disposition within the first member, the second member being joined to the first member by a deformation resistance weld, the deformation resistance weld being formed by contacting the second member with a first electrode, contacting an exterior portion of the first member with a second electrode, and applying a voltage through the first and second electrodes to adhere a portion of the first member to a portion of the second member,
wherein said first and second members define cooperating concentric wall surfaces, wherein one of said wall surfaces defines a stepped-edge feature and the other of said wall surfaces defines an angled chamfer juxtaposed to effect a line contact there between, and wherein said first and second members are dimensioned to establish a substantial interference fit there between.

2. The assembly of claim 1, wherein a location of the second member with respect to the first member is determined by a position at which said first member wall surface abuts said generally transverse second member wall surface when the deformation resistance weld is formed.

3. The assembly of claim 1, wherein the second member is positioned in a desired location relative to the first member utilizing at least one of the first and second electrodes when the deformation resistance weld is formed.

4. The assembly of claim 1, further comprising a flash trap formed when the second member is joined to the first member, the flash trap being located within a recess between the cooperating concentric wall surfaces and the deformation resistance weld.

5. The assembly of claim 1, wherein the deformation resistance weld is formed by abutting an angled chamfer of an internal surface of the first member against the second member, applying pressure against the second member with the first electrode in a first direction, and applying pressure against the exterior portion of the first member with the second electrode in a second direction generally perpendicular to the first direction while applying the voltage through the first and second electrodes.

6. An assembly comprising:
a first generally tubular member; and
a second member configured for at least partial disposition within the first member, the second member being joined to the first member by a deformation resistance weld, the deformation resistance weld being formed by contacting the second member with a first electrode, contacting an exterior portion of the first member with a second electrode, and applying a voltage through the first and second electrodes to adhere a portion of the first member to a portion of the second member,
wherein the first member defines an open end formed with a pair of angled chamfers, wherein a first side of the second member is formed with an annular groove that is generally concentric with the open end of the first member, the annular groove having a diameter substantially equal to a diameter of the open end of the first member, and wherein the open end of the first member and the annular groove of the second member define respective joining surfaces that are abutted against one another when the deformation resistance weld is formed.

7. An assembly comprising:
a first generally tubular member; and
a second member configured for at least partial disposition within the first member, the second member being joined to the first member by a deformation resistance weld, the deformation resistance weld being formed by contacting the second member with a first electrode, contacting an exterior portion of the first member with a second electrode, and applying a voltage through the first and second electrodes to adhere a portion of the first member to a portion of the second member,
wherein the first member defines an open end formed with an angled chamfer, wherein a first side of the second member is formed with an interstitial annular groove that extends to the periphery of the first member, the interstitial annular groove forming an inner radial wall that is generally concentric with the open end of the first member, the inner radial wall having a similar diameter to the open end of the first member, and wherein the open end of the first member and the inner radial wall of the second member define respective joining surfaces that are abutted against one another when the deformation resistance weld is formed.

* * * * *